(12) United States Patent  (10) Patent No.: US 8,143,382 B2
Shiga et al.  (45) Date of Patent: Mar. 27, 2012

(54) PYRAZOLE DISAZO DYE AND INK CONTAINING THE DYE

(75) Inventors: Yasushi Shiga, Kanagawa (JP); Mio Ishida, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 12/742,506

(22) PCT Filed: Nov. 11, 2008

(86) PCT No.: PCT/JP2008/070527
§ 371 (c)(1),
(2), (4) Date: Aug. 5, 2010

(87) PCT Pub. No.: WO2009/063880
PCT Pub. Date: May 22, 2009

(65) Prior Publication Data
US 2010/0292450 A1 Nov. 18, 2010

(30) Foreign Application Priority Data
Nov. 12, 2007 (JP) .................. 2007-293226

(51) Int. Cl.
C09B 31/147 (2006.01)
C09D 11/00 (2006.01)
(52) U.S. Cl. ...................... 534/756; 106/31.5
(58) Field of Classification Search ........................ None
See application file for complete search history.

(56) References Cited

U.S. PATENT DOCUMENTS 3,234,306 A * 2/1966 Reimer et al. ................ 558/193
3,449,317 A * 6/1969 Montmollin .................. 534/588
5,288,858 A * 2/1994 Schaetzer ..................... 534/756
7,704,310 B2 * 4/2010 Devonald ..................... 106/31.5

FOREIGN PATENT DOCUMENTS
JP 8 108634 4/1996

OTHER PUBLICATIONS

English machine translation of JP 08-108634, Apr. 30, 1996.*

* cited by examiner

Primary Examiner — Fiona T Powers
(74) Attorney, Agent, or Firm — Oblon, Spivak, McClelland, Maier & Neustadt, L.L.P.

(57) ABSTRACT

The invention provides a specific pyrazole disazo dye which is a yellow dye having excellent solubility in nonpolar solvents, in particular, hydrocarbon solvents, and having a high extinction coefficient. The dye preferably is preferably a pyrazole disazo dye represented by the following general formula (I):

[Chem. 1]

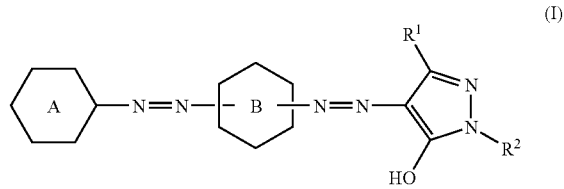

(wherein $R^1$ represents a $C_2$-$C_{10}$ alkyl group; $R^2$ represents a $C_3$-$C_{10}$ alkyl group; the six-membered ring A represents a phenyl group which may have a substituent; and the six-membered ring B represents a phenylene group which may have a substituent).

17 Claims, No Drawings

PYRAZOLE DISAZO DYE AND INK CONTAINING THE DYE

TECHNICAL FIELD

The present invention relates to a pyrazole disazo dye useful in display materials, optical recording media, etc., and to an ink containing the dye.

BACKGROUND ART

In recent years, many organic dyes are used in display materials, optical recording media, etc. In the case where a dye is used in a coating process or an ink-jet process, not only a high molar extinction coefficient but also high solubility in solvents is required for heightening coloring efficiency. Dyes for use in electrowetting displays based on an image display system, in which a plurality of pixels filled with two phases, i.e., an aqueous medium and an oil-based color ink, are disposed on a substrate and affinity between the aqueous medium and the oil-based color ink is controlled by voltage application ON-OFF switching with respect to each pixel to spread/gather the oil-based color ink on the substrate and thereby display an image (*Nature* (London), 425, 383 (2003)), are required to have high solubility in hydrocarbon solvents.

Thermal transfer recording materials are known as one kind of recording materials. Various pyrazole disazo dye compounds including the following compounds are shown in patent document 1 (JP-A-8-108634) as yellow to orange dyes which are usable in those materials and have a high color density and excellent light resistance.

[Chem. 1]

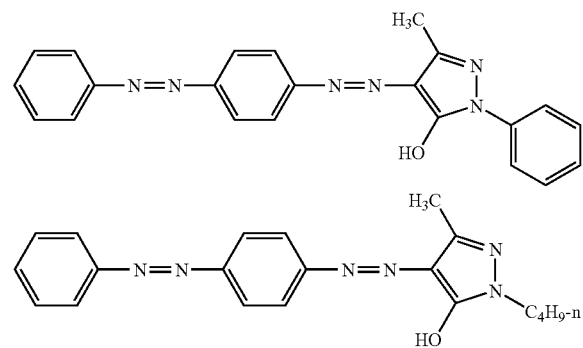

Patent Document 1: JP-A-8-108634

DISCLOSURE OF THE INVENTION

Problem that the Invention is to Solve

However, as a result of investigations made by the present inventors, it was found that the dyes specifically shown in patent document 1 are required to be further improved in solubility in nonpolar solvents, in particular, solubility in hydrocarbon solvents.

An object of the invention is to provide a yellow dye having excellent solubility in nonpolar solvents, in particular, hydrocarbon solvents, and having a high extinction coefficient.

Means for Solving the Problem

The present inventors diligently made investigations in order to overcome the problem and, as a result, have found that a pyrazole disazo dye in which the pyrazole framework has a $C_2$-$C_{10}$ alkyl group and a $C_3$-$C_{10}$ alkyl group has a high extinction coefficient and excellent solubility in nonpolar organic solvents including hydrocarbon solvents. The invention has been thus completed.

Namely, essential points of the invention are as follows.

[1] A pyrazole disazo dye having a solubility in n-decane of 1% by weight or higher at 25° C. and ordinary pressure.

[2] The pyrazole disazo dye according to the item [1], which is represented by the following general formula (I):

[Chem. 2]

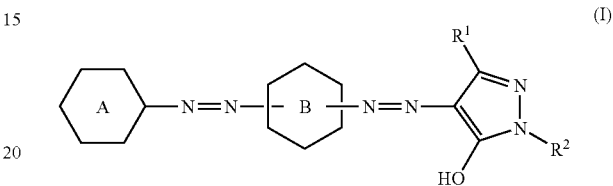

(wherein $R^1$ represents a $C_2$-$C_{10}$ alkyl group; $R^2$ represents a $C_3$-$C_{10}$ alkyl group; the six-membered ring A represents a phenyl group which may have a substituent; and the six-membered ring B represents a phenylene group which may have a substituent).

[3] The pyrazole disazo dye according to the item [2], wherein $R^2$ is a branched alkyl.

[4] The pyrazole disazo dye according to the item [2] or [3], wherein the six-membered ring A is a phenyl group which may be substituted with at least one of $C_1$-$C_{10}$ alkyl groups and $C_1$-$C_{10}$ alkoxy groups, and the six-membered ring B is a phenylene group which may be substituted with at least one of $C_1$-$C_{10}$ alkyl groups and $C_1$-$C_{10}$ alkoxy groups.

[5] The pyrazole disazo dye according to any one of the items [2] to [4], wherein the six-membered ring B is a 1,4-phenylene group.

[6] A pyrazole disazo dye wherein the product of a molar extinction coefficient ($Lmol^{-1}cm^{-1}$) of an n-decane solution thereof at an absorption maximum wavelength in the range of 350-800 nm and a concentration ($molL^{-1}$) of a saturated solution thereof in the solvent at 25° C. and ordinary pressure, is 2,000 ($cm^{-1}$) or larger.

[7] An ink comprising the pyrazole disazo dye according to any one of the items [1] to [6].

Effects of the Invention

The pyrazole disazo dye of the invention has both a high extinction coefficient and high solubility in solvents, and is hence useful as a dye for thermal transfer recording or as a dye for use in displays and the like, in particular, electrowetting displays.

BEST MODE FOR CARRYING OUT THE INVENTION

The invention is explained below in detail.

I. With Respect to Pyrazole Disazo Dye of the Invention:

The pyrazole disazo dye according to the invention has high solubility in nonpolar organic solvents including aliphatic hydrocarbon solvents, and has a solubility in n-decane of 1% by weight or higher at 25° C. and ordinary pressure. The structures possessed by the pyrazole disazo dye of the invention are explained below.

I-1. With Respect to Connecting Group Connecting the Two Azo Bonds:

The pyrazole disazo dye of the invention to be used may be one having a pyrazole disazo structure in which an azo group (second azo group) has been bonded to a pyrazole monoazo group (in particular, 4-pyrazole monoazo group) through a connecting group. This pyrazole disazo structure preferably is a structure in which a substituent that does not reduce solubility in aliphatic hydrocarbon solvents has been bonded to the other end of the second azo group, i.e., the end not bonded to the connecting group.

The connecting group may be any connecting group which does not reduce solubility in aliphatic hydrocarbon solvents. Examples thereof include divalent lowly polar aromatic groups which may have substituents.

Examples of the divalent lowly polar aromatic groups include divalent aromatic hydrocarbon groups having 6-20 carbon atoms, such as phenylene, naphthylene, biphenylene, azulenylene, anthracenylene, terphenylene, and pyrenylene; and divalent aromatic heterocyclic groups having 2-20 carbon atoms and having a framework structure such as a five-membered monocycle, e.g., a furan ring, thiophene ring, pyrrole ring, imidazole ring, thiazole ring, or oxadiazole ring, a six-membered monocycle, e.g., a pyridine ring or a pyrazine ring, a polycycle, e.g., a terthiophene ring, or a fused ring, e.g., a phenanthrene ring, quinoline ring, isoquinoline ring, quinoxaline ring, benzofuran ring, carbazole ring, or dibenzothiophene ring.

The divalent lowly polar aromatic groups may further have substituents. Each divalent lowly polar aromatic group may have one substituent or a plurality of substituents. When a plurality of substituents are possessed, the substituents may be the same or different. The substituents which may be possessed by the lowly polar aromatic groups preferably are nonpolar substituents from the standpoint of solubility in nonpolar organic solvents such as hydrocarbon solvents. Examples thereof include $C_1$-$C_{10}$ alkyl groups, alkoxy groups, $C_1$-$C_{10}$ haloalkyl groups, and $C_1$-$C_{10}$ haloalkoxy groups. Preferred of these are $C_1$-$C_{10}$ alkyl groups and/or $C_1$-$C_{10}$ alkoxy groups.

Examples of the $C_1$-$C_{10}$ alkyl groups include linear alkyl groups such as propyl, butyl, pentyl, hexyl, heptyl, octyl, nonyl, and decyl; branched alkyl groups such as isopropyl, isobutyl, sec-butyl, tert-butyl, and isooctyl; and alkyl groups having a cycloalkane structure, such as cyclopropyl, cyclopentyl, cyclohexyl, and cyclopropylmethyl.

Examples of the $C_1$-$C_{10}$ alkoxy groups include linear alkoxy groups such as methoxy, ethoxy, propoxy, butoxy, pentyloxy, hexyloxy, heptyloxy, octyloxy, nonyloxy, and decyloxy; branched alkoxy groups such as isopropoxy, isobutoxy, sec-butoxy, tert-butoxy, and isooctyloxy; and alkoxy groups having a cycloalkane structure, such as cyclopropoxy, cyclopentyloxy, cyclohexyloxy, and cyclopropylmethyloxy.

The haloalkyl groups and the haloalkoxy groups may be those alkyl and alkoxy groups which have been substituted with halogen atoms such as fluorine atoms, chlorine atoms, bromine atoms, or iodine atoms. Examples thereof include trifluoromethyl, pentafluoroethyl, nonafluorobutyl, and trifluoromethoxy.

Of such $C_1$-$C_{10}$ alkyl groups and $C_1$-$C_{10}$ alkoxy groups, the $C_1$-$C_{10}$ alkyl groups are preferred because the alkyl groups are more nonpolar. From the standpoints of the availability of starting materials and solubility, $C_3$-$C_8$ alkyl groups such as propyl, butyl, pentyl, and hexyl are preferred. It is more preferred that these alkyl groups are linear alkyl groups.

Preferred of the connecting groups shown above as examples of the connecting group which connects the two azo bonds are $C_6$-$C_{20}$, in particular, $C_6$-$C_{10}$ aromatic hydrocarbon groups and the like which may have one or more substituents. More preferred are a phenylene group which may have one or more substituents and a naphthylene group which may have one or more substituents. Especially preferred is a 1,4-phenylene group which may have one or more substituents.

From the standpoint of solubility, the connecting group preferably is a 1,4-phenylene group substituted with one or more $C_1$-$C_{10}$ alkyl groups and/or one or more $C_1$-$C_{10}$ alkoxy groups, and more preferably is a 1,4-phenylene group substituted with one or more $C_1$-$C_4$ alkyl groups, e.g., methyl or ethyl groups, and/or one or more $C_1$-$C_4$ alkoxy groups, e.g., methoxy or ethoxy groups. The 1,4-phenylene group may have one substituent or a plurality of substituents. When a plurality of substituents are possessed, the substituents may be the same or different. However, it is especially preferred that the 1,4-phenylene group should have no substituent from the standpoint of the availability of starting materials.

I-2. With Respect to Substituents Possessed by the Pyrazole Ring:

The pyrazole ring possessed by the pyrazole disazo dye of the invention may have any desired substituents so long as the substituents do not reduce solubility in aliphatic hydrocarbon solvents. From the standpoint of synthesis, it is preferred that the azo bond should have been bonded in the 4-position of the pyrazole ring and that the pyrazole ring should have in the 5-position a substituent which is a hydroxyl group that may have a substituent or is an amino group that may have a substituent. The pyrazole ring may have substituents in the 1-position and 3-position, and the substituents preferably are hydrocarbon-derived substituents. Examples of the substituents include $C_1$-$C_{20}$ alkyl groups which may have a substituent, $C_2$-$C_{20}$ (hetero)aryl groups which may have a substituent, and $C_1$-$C_{20}$ alkoxy groups which may have a substituent.

The term "(hetero)aryl groups" in the invention means aryl groups and heteroaryl groups.

Examples of the alkyl groups having 1-20 carbon atoms, preferably 1-10 carbon atoms, include linear alkyl groups such as ethyl, propyl, butyl, pentyl, hexyl, heptyl, octyl, nonyl, and decyl; branched alkyl groups such as isopropyl, isobutyl, sec-butyl, tert-butyl, and isooctyl; and alkyl groups having a cycloalkane structure, such as cyclopropyl, cyclopentyl, cyclohexyl, and cyclopropylmethyl.

Examples of the (hetero)aryl groups having 2-20 carbon atoms include aryl groups having 6-20 carbon atoms, such as phenyl, naphthyl, biphenyl, azulenyl, anthracenyl, terphenyl, and pyrenyl; and monovalent heteroaryl groups having 2-20 carbon atoms and having a framework structure such as a five-membered monocycle, e.g., a furan ring, thiophene ring, pyrrole ring, imidazole ring, thiazole ring, or oxadiazole ring, a six-membered monocycle, e.g., a pyridine ring or a pyrazine ring, a polycycle, e.g., a terthiophene ring, or a fused ring, e.g., a phenanthrene ring, quinoline ring, isoquinoline ring, quinoxaline ring, benzofuran ring, carbazole ring, or dibenzothiophene ring.

Examples of the alkoxy groups having 1-20 carbon atoms, preferably 1-10 carbon atoms, include linear alkoxy groups such as methoxy, ethoxy, propoxy, butoxy, pentyloxy, hexyloxy, heptyloxy, octyloxy, nonyloxy, and decyloxy; branched alkoxy groups such as isopropoxy, isobutoxy, sec-butoxy, tert-butoxy, and isooctyloxy; and alkoxy groups having a cycloalkane structure, such as cyclopropoxy, cyclopentyloxy, cyclohexyloxy, and cyclopropylmethyloxy.

In the case where the pyrazole ring has a hydroxyl group or an amino group in the 5-position, the hydroxyl group or amino group may have a substituent. However, the group preferably has no substituent.

I-3. With Respect to Substituent Bonded to the Other End of the Second Azo Group, i.e., to the End not Bonded to the Connecting Group:

In the pyrazole disazo structure of the pyrazole disazo dye of the invention, the substituent bonded to the other end of the second azo group, i.e., to the end not bonded to the connecting group, may be any substituent which does not reduce solubility in aliphatic hydrocarbon solvents. Examples thereof include lowly polar aromatic groups which may have substituents.

Examples of the lowly polar aromatic groups include aromatic hydrocarbon groups having 6-20 carbon atoms, such as phenyl, naphthyl, biphenyl, azulenyl, anthracenyl, terphenyl, and pyrenyl; and monovalent heterocyclic aromatic groups having 2-20 carbon atoms and having a framework structure such as a five-membered monocycle, e.g., a furan ring, thiophene ring, pyrrole ring, imidazole ring, thiazole ring, or oxadiazole ring, a six-membered monocycle, e.g., a pyridine ring or a pyrazine ring, a polycycle, e.g., a terthiophene ring, or a fused ring, e.g., a phenanthrene ring, quinoline ring, isoquinoline ring, quinoxaline ring, benzofuran ring, carbazole ring, or dibenzothiophene ring.

The lowly polar aromatic groups may further have substituents. Each lowly polar aromatic group may have one substituent or a plurality of substituents. When a plurality of substituents are possessed, the substituents may be the same or different. The substituents which may be possessed by the lowly polar aromatic groups preferably are nonpolar substituents from the standpoint of solubility in nonpolar organic solvents such as hydrocarbon solvents. Examples thereof include $C_1$-$C_{10}$ alkyl groups, $C_1$-$C_{10}$ alkoxy groups, $C_1$-$C_{10}$ haloalkyl groups, and $C_1$-$C_{10}$ haloalkoxy groups. Preferred of these are $C_1$-$C_{10}$ alkyl groups and/or $C_1$-$C_{10}$ alkoxy groups.

Examples of the $C_1$-$C_{10}$ alkyl groups include linear alkyl groups such as propyl, butyl, pentyl, hexyl, heptyl, octyl, nonyl, and decyl; branched alkyl groups such as isopropyl, isobutyl, sec-butyl, tert-butyl, and isooctyl; and alkyl groups having a cycloalkane structure, such as cyclopropyl, cyclopentyl, cyclohexyl, and cyclopropylmethyl.

Examples of the $C_1$-$C_{10}$ alkoxy groups include linear alkoxy groups such as methoxy, ethoxy, propoxy, butoxy, pentyloxy, hexyloxy, heptyloxy, octyloxy, nonyloxy, and decyloxy; branched alkoxy groups such as isopropoxy, isobutoxy, sec-butoxy, tert-butoxy, and isooctyloxy; and alkoxy groups having a cycloalkane structure, such as cyclopropoxy, cyclopentyloxy, cyclohexyloxy, and cyclopropylmethyloxy.

The haloalkyl groups and the haloalkoxy groups may be those alkyl and alkoxy groups which have been substituted with halogen atoms such as fluorine atoms, chlorine atoms, bromine atoms, or iodine atoms. Examples thereof include trifluoromethyl, pentafluoroethyl, nonafluorobutyl, and trifluoromethoxy.

Of such $C_1$-$C_{10}$ alkyl groups and $C_1$-$C_{10}$ alkoxy groups, the $C_1$-$C_{10}$ alkyl groups are preferred because the alkyl groups are more nonpolar. From the standpoints of the availability of starting materials and solubility, $C_3$-$C_8$ alkyl groups such as propyl, butyl, pentyl, and hexyl are preferred. It is more preferred that these alkyl groups are linear alkyl groups.

Preferred of the substituents shown above as examples of the substituent bonded to the other end of the second azo bond, i.e., to the end not bonded to the connecting group, are $C_6$-$C_{20}$, in particular, $C_6$-$C_{10}$ aromatic hydrocarbon groups or the like which may have one or more substituents. Especially preferred are a phenyl group which may have one or more substituents and a naphthyl group which may have one or more substituents. In particular, a phenyl group which may have one or more substituents is preferred.

From the standpoint of solubility, the connecting group which connects the two azo bonds more preferably is a phenyl group substituted with one or more $C_1$-$C_{10}$ alkyl groups, and especially preferably is a phenyl group substituted with one or more $C_3$-$C_8$ linear alkyl groups. The phenyl group may have one substituent or a plurality of substituents. When a plurality of substituents are possessed, the substituents may be the same or different. Although the positions of the substituents possessed by the phenyl group are not particularly limited, a preferred position is para to the azo bond.

I-4. With Respect to Pyrazole Disazo Dye Represented by General Formula (I):

Preferred examples of the pyrazole disazo dye according to the invention are represented by the following general formula (I). Each constituent element of general formula (I) is explained below in detail.

[Chem. 3]

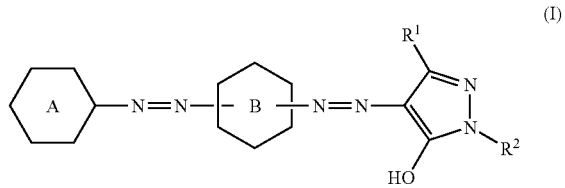

(In the formula, $R^1$ represents a $C_2$-$C_{10}$ alkyl group; $R^2$ represents a $C_3$-$C_{10}$ alkyl group; the six-membered ring A represents a phenyl group which may have a substituent; and the six-membered ring B represents a phenylene group which may have a substituent.)

I-4-1. With Respect to $R^1$:

In general formula (I), $R^1$ represents a $C_2$-$C_{10}$ alkyl group. The $C_2$-$C_{10}$ alkyl group employed as $R^1$ enables the dye to have high solubility in nonpolar solvents and a high gram extinction coefficient. This dye further has the advantage of being easy to synthesize.

In case where $R^1$ is a hydrogen atom or an alkyl group having too few carbon atoms, this poses a problem that solubility in nonpolar solvents decreases. On the other hand, in case where the alkyl group has too many carbon atoms, this poses a problem that the gram extinction coefficient decreases or a starting material is difficult to procure.

In case where $R^1$ is a group containing one or more oxygen atoms or nitrogen atoms, such as an alkoxy group, alkoxycarbonyl group, carbamoyl group, or alkoxyalkyl group, this tends to pose a problem that solubility in nonpolar solvents decreases.

Examples of $R^1$ include linear alkyl groups such as ethyl, propyl, butyl, pentyl, hexyl, heptyl, octyl, nonyl, and decyl; branched alkyl groups such as isopropyl, isobutyl, sec-butyl, tert-butyl, and isooctyl; and alkyl groups having a cycloalkane structure, such as cyclopropyl, cyclopentyl, cyclohexyl, and cyclopropylmethyl. Especially preferred examples of $R^1$ are the $C_2$-$C_6$ linear alkyl groups, i.e., ethyl, propyl, butyl, pentyl, and hexyl.

I-4-2. With Respect to $R^2$:

$R^2$ represents a $C_3$-$C_{10}$ alkyl group. The $C_3$-$C_{10}$ alkyl group employed as $R^2$ enables the dye to have high solubility in nonpolar solvents and a high gram extinction coefficient. This dye further has the advantage of being easy to synthesize.

In case where $R^2$ is a hydrogen atom or an alkyl group having too few carbon atoms, this poses a problem that solubility in nonpolar solvents decreases. On the other hand, in case where the alkyl group has too many carbon atoms, this tends to pose a problem that the gram extinction coefficient decreases or a starting material is difficult to procure.

In case where $R^2$ is an aryl group such as phenyl, this tends to pose a problem that solubility in nonpolar solvents, in particular, aliphatic nonpolar organic solvents, decreases.

Examples of $R^2$ include linear alkyl groups such as propyl, butyl, pentyl, hexyl, heptyl, octyl, nonyl, and decyl; branched alkyl groups such as isopropyl, isobutyl, sec-butyl, tert-butyl, and isooctyl; and alkyl groups having a cycloalkane structure, such as cyclopropyl, cyclopentyl, cyclohexyl, and cyclopropylmethyl.

From the standpoints of high gram extinction coefficient and the availability of starting materials, $R^2$ preferably is $C_3$-$C_6$. From the standpoint of solubility in nonpolar solvents, $R^2$ preferably is a branched alkyl group, and most preferably is tert-butyl.

I-4-3. With Respect to Six-Membered Ring A:

The six-membered ring A represents a phenyl group which may have a substituent.

The substituent which may be possessed by the six-membered ring A preferably is a nonpolar substituent from the standpoint of solubility in nonpolar organic solvents such as hydrocarbon solvents. Examples thereof include $C_1$-$C_{10}$ alkyl groups, $C_1$-$C_{10}$ alkoxy groups, $C_1$-$C_{10}$ haloalkyl groups, and $C_1$-$C_{10}$ haloalkoxy groups. Preferred of these are $C_1$-$C_{10}$ alkyl groups and/or $C_1$-$C_{10}$ alkoxy groups.

Examples of the $C_1$-$C_{10}$ alkyl groups include linear alkyl groups such as propyl, butyl, pentyl, hexyl, heptyl, octyl, nonyl, and decyl; branched alkyl groups such as isopropyl, isobutyl, sec-butyl, tert-butyl, and isooctyl; and alkyl groups having a cycloalkane structure, such as cyclopropyl, cyclopentyl, cyclohexyl, and cyclopropylmethyl.

Examples of the $C_1$-$C_{10}$ alkoxy groups include linear alkoxy groups such as methoxy, ethoxy, propoxy, butoxy, pentyloxy, hexyloxy, heptyloxy, octyloxy, nonyloxy, and decyloxy; branched alkoxy groups such as isopropoxy, isobutoxy, sec-butoxy, tert-butoxy, and isooctyloxy; and alkoxy groups having a cycloalkane structure, such as cyclopropoxy, cyclopentyloxy, cyclohexyloxy, and cyclopropylmethyloxy.

The haloalkyl groups and the haloalkoxy groups may be those alkyl and alkoxy groups which have been substituted with halogen atoms such as fluorine atoms, chlorine atoms, bromine atoms, or iodine atoms. Examples thereof include trifluoromethyl, pentafluoroethyl, nonafluorobutyl, and trifluoromethoxy.

Of such $C_1$-$C_{10}$ alkyl groups and $C_1$-$C_{10}$ alkoxy groups, the $C_1$-$C_{10}$ alkyl groups are preferred because the alkyl groups are more nonpolar. From the standpoints of the availability of starting materials and solubility, $C_3$-$C_8$ alkyl groups such as propyl, butyl, pentyl, and hexyl are preferred. It is more preferred that these alkyl groups are linear alkyl groups.

From the standpoint of solubility, the six-membered ring A more preferably is a phenyl group substituted with one or more $C_1$-$C_{10}$ alkyl groups, and especially preferably is a $C_3$-$C_8$ linear alkyl group. When the six-membered ring A has at least one substituent, the ring may have one substituent or a plurality of substituents. When the ring has a plurality of substituents, the substituents may be the same or different. Although the positions in which the six-membered ring A is substituted with substituents are not particularly limited, a preferred position is para to the azo bond.

I-4-4. With Respect to Six-Membered Ring B:

The six-membered ring B preferably represents a 1,4-phenylene group which may have a substituent. Examples of the substituent which may be possessed by the six-membered ring B include the same groups as those enumerated above as examples of the substituent of the six-membered ring A. Preferred of these are $C_1$-$C_{10}$ alkyl groups and/or $C_1$-$C_{10}$ alkoxy groups. Especially preferred examples of the substituent include $C_1$-$C_4$ alkyl groups such as methyl and ethyl and $C_1$-$C_4$ alkoxy groups such as methoxy and ethoxy.

The six-membered ring B may have one substituent or a plurality of substituents. When a plurality of substituents are possessed, the substituents may be the same or different. However, it is especially preferred that the six-membered ring B should have no substituent, from the standpoint of the availability of starting materials.

I-4-5. Examples of Dye Compound Represented by General Formula (I):

Specific examples of the dye compound represented by general formula (I) are shown below. However, the invention should not be construed as being limited to the following examples unless the invention departs from the spirit thereof.

[Chem. 4]

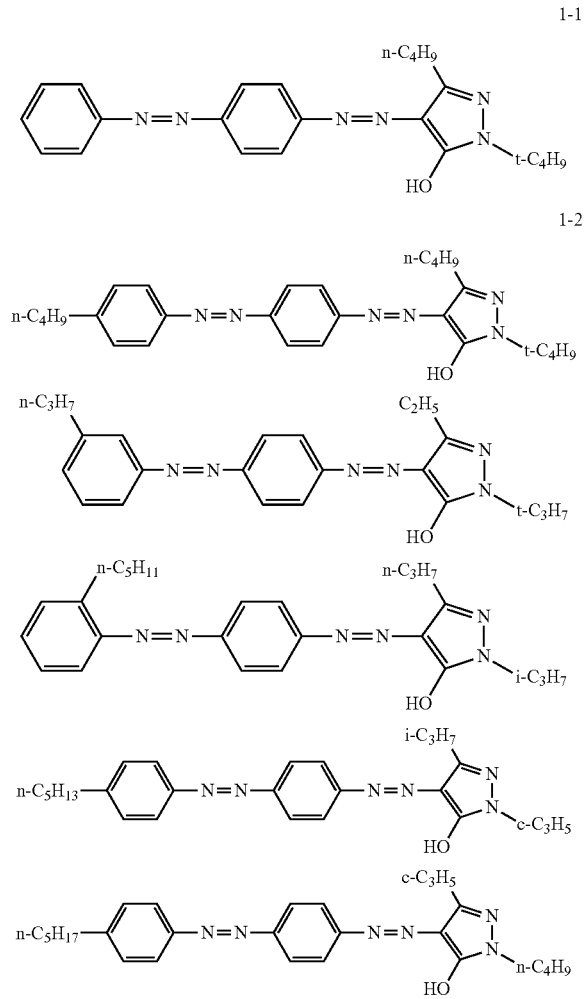

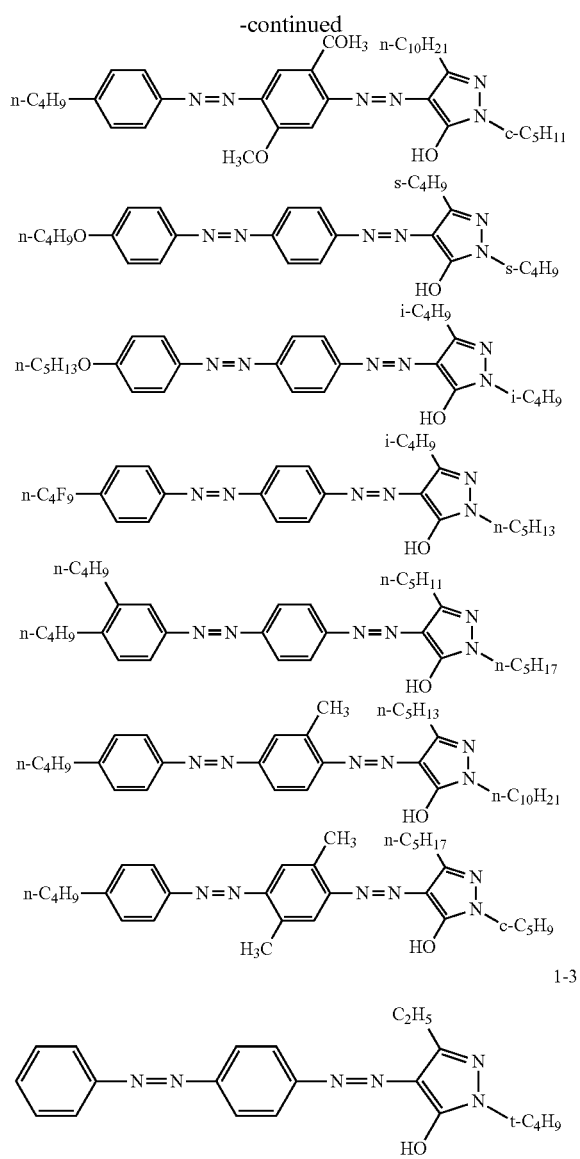

The dye of the invention can be synthesized according to known methods, for example, the method described in the above-cited patent document 1 (JP-A-8-108634).

I-4-6. Features of Pyrazole Disazo Dye of the Invention:

1) Molecular Weight

The pyrazole disazo dye of the invention, which has been described above, has a molecular weight of generally 2,000 or lower, preferably 1,000 or lower, in terms of molecular weight including that of the substituents in the case where the dye has substituents, from the standpoint of gram extinction coefficient.

2) Solubility

The pyrazole disazo dye of the invention has excellent solubility in nonpolar solvents, in particular, in hydrocarbon solvents, and has a solubility in n-decane of generally 1% by weight or higher, preferably 3% by weight or higher, more preferably 5% by weight or higher. The higher the solubility thereof, the more the dye is preferred. However, the solubility thereof is generally up to about 80% by weight.

In the case where the pyrazole disazo dye of the invention is used in an electrowetting display, it is desirable, in view of the principle thereof, that the dye should be insoluble in water.

The term "insoluble in water" herein means that the solubility of the dye in water under the conditions of 25° C. and 1 atm is generally 0.1% by weight or lower, preferably 0.01% by weight or lower.

3) Absorption Maximum Wavelength

The pyrazole disazo dye of the invention has a yellow tone, and a solution thereof in a nonpolar solvent has an absorption maximum wavelength of generally 350-500 nm, preferably 380-480 nm, in the wavelength range of 350-800 nm. It is preferred that the solution should have no absorption maximum in the wavelength ranges other than a 350-500 nm range.

4) εC

The pyrazole disazo dye of the invention includes a pyrazole disazo dye which has especially high solubility to satisfy the following: the product of the molar extinction coefficient ε ($Lmol^{-1}cm^{-1}$) in n-decane at an absorption maximum wavelength and the concentration C ($molL^{-1}$) of a saturated solution thereof in the solvent, εC, is 2,000 ($cm^{-1}$) or larger. The larger the value of εC, the more the dye is preferred. Although there is no particular upper limit on the value of εC, the value thereof is generally up to about 40,000 ($cm^{-1}$).

I-5. With Respect to Ink of the Invention:

The ink of the invention contains one or more pyrazole disazo dyes of the invention described above. The ink of the invention may contain only one pyrazole disazo dye of the invention, or may contain two or more pyrazole disazo dyes of the invention in any desired proportion.

The ink of the invention may contain a pyrazole disazo dye of the invention as the only dye, or may further contain other dyes so as to have a desired color tone. For example, a pyrazole disazo dye of the invention can be mixed with a red dye and a blue dye to obtain a black color.

A pyrazole disazo dye of the invention is dissolved in a nonpolar solvent, such as the aliphatic hydrocarbon solvents which will be enumerated under I-5-2., together with other dye(s) which are optionally used, whereby an ink for electrowetting displays can be obtained. Furthermore, by dissolving or dispersing a pyrazole disazo dye of the invention in a solvent together with any desired binder, an ink for use in forming the colorant layer of a thermal transfer sheet for thermal transfer can be obtained. Examples of the binder and examples of the solvent will be explained under I-5-3. and I-5-4., respectively.

The concentration of the dye of the invention in the ink of the invention is regulated to any desired concentration according to the intended use of the ink. In the case of use as a yellow dye for electrowetting displays, the dye is diluted with a nonpolar solvent so as to result in a concentration of generally 0.2% by weight or higher according to a required value of εC. In the case of use as a dye for thermal transfer, the dye is used in a concentration in the range of generally 1-20% by weight based on the solvent.

I-5-1. With Respect to Other Dyes Optionally Contained in Ink of the Invention:

Other dyes which the ink of the invention may contain can be selected at will from dyes having solubility/dispersibility in the medium to be used, so long as the dyes selected do not lessen the effect of the dye of the invention.

For example, in the case where the ink of the invention is to be used for electrowetting displays, any desired dyes selected from dyes soluble in nonpolar solvents such as aliphatic hydrocarbon solvents can be used as the other dyes which may be contained in the ink of the invention. Examples of such dyes include Oil Blue N (alkylamine-substituted anthraquinone), Solvent Green, Sudan Red, and Sudan Black.

In the case where the ink of the invention is to be used for forming the colorant layer of a thermal transfer sheet for thermal transfer, various known dyes for thermal transfer can be used as the other dyes which may be contained in the ink of the invention. Examples of such dyes include the dyes disclosed in JP-A-2003-205686 as dyes for incorporation into yellow, magenta, and cyan colorant layers.

I-5-2. Nonpolar Solvent

Examples of the nonpolar solvent in which the dye is dissolved include aliphatic hydrocarbon solvents such as n-decane, dodecane, tetradecane, hexadecane, and paraffiml.

I-5-3. Binder

Any desired binder can be used so long as it is a known binder for general use in inks for forming the colorant layers of thermal transfer sheets for thermal transfer. Examples thereof include the binders shown in, e.g., JP-A-8-108634. Specifically, examples thereof include water-soluble resins such as cellulosic resins, acrylic acid resins, starches, and epoxy resins and resins soluble in organic solvents, such as acrylic resins, methacrylic resins, polystyrene, polycarbonates, polysulfones, polyethersulfones, poly(vinyl butyral), ethyl cellulose, acetyl cellulose, polyesters, acrylonitrile/styrene copolymer (AS) resins, and phenoxy resins. Incidentally, an adequate mixing ratio (by weight) between the binder and the dye is in the range of from 1:2 to 2:1.

I-5-4. Solvent

Any desired solvent can be used so long as it is a solvent generally used as a medium for preparing inks for forming the colorant layers of thermal transfer sheets for thermal transfer. Examples thereof include the solvents shown in, e.g., JP-A-8-108634. Specifically, examples thereof include water and organic solvents including alcohols such as methyl alcohol, ethyl alcohol, isopropyl alcohol, and isobutyl alcohol, Cellosolves such as methyl Cellosolve and ethyl Cellosolve, aromatics such as toluene, xylene, and chlorobenzene, esters such as ethyl acetate and butyl acetate, ketones such as acetone, methyl ethyl ketone, methyl isobutyl ketone, and cyclohexanone, chlorinated solvents such as methylene chloride, chloroform, and trichloroethylene, ethers such as tetrahydrofuran and dioxane, N,N-dimethylformamide, and N-methylpyrrolidone. These solvents are used alone or in combination.

I-5-3. Other Ingredients

The ink of the invention may contain any desired additives according to need, besides the ingredients described above.

For example, in the case where the ink of the invention is for forming the colorant layer of a thermal transfer sheet for thermal transfer, ingredients such as, e.g., organic or inorganic non-sublimable fine particles, dispersant, antistatic agent, antifoamer, antioxidant, and viscosity regulator can be added to the ink according to need besides the ingredients described above.

The content of such additives is not particularly limited. However, the additives are used usually in an amount of about 20% by weight or smaller based on the overall ink amount.

EXAMPLES

The invention will be explained below in detail by reference to Examples, but the invention should not be construed as being limited to the following Examples unless the invention departs from the spirit thereof.

Example 1

Synthesis of Dye

[Chem. 5]

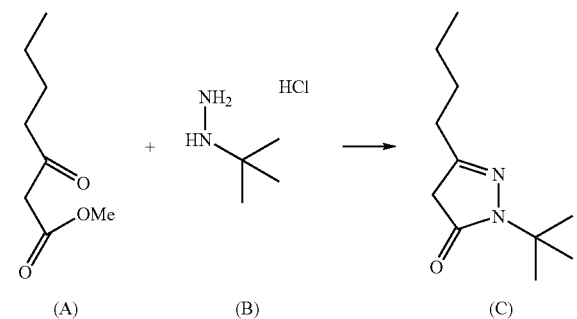

To 28% sodium methoxide methanol solution (60.8 g; 315 mmol) was added tert-butylhydrazine hydrochloride (B) (39.3 g; 315 mmol) at room temperature in a nitrogen stream. The mixture was stirred at room temperature for 30 minutes. The precipitate was removed by suction filtration and washed with ethanol (20 mL) to obtain a tert-butylhydrazine solution as a filtrate. Methyl 3-oxoheptanoate (A) (49.9 g; 315 mmol) was introduced into another vessel, and the tert-butylhydrazine solution was dropped thereinto while keeping the internal temperature at 40 degrees. The resultant mixture was stirred for 2 hours at an internal temperature of 60° C. and a bath temperature of 70° C. and then concentrated under vacuum. Diethyl ether (200 mL) was added thereto, and the mixture was stirred with cooling with ice. The precipitate was taken out by filtration and washed with diethyl ether to obtain first crystals (18.7 g). The mother liquor was concentrated, and the resultant precipitate was washed with hexane (200 mL) to obtain second crystals (19.8 g). The first crystals and the second crystals were brought together to obtain 38.5 g of the compound (C) (yield, 62%).

[Chem. 6]

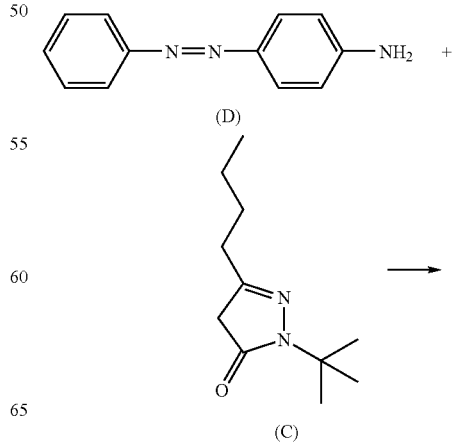

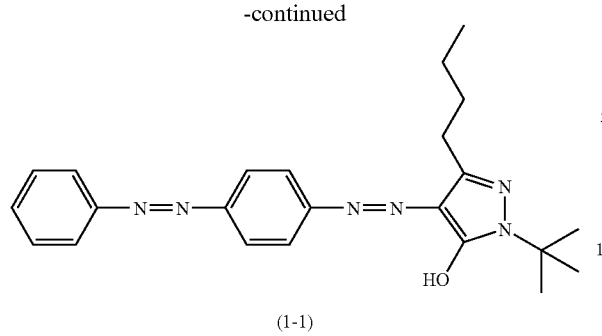

(1-1)

A mixture of the compound (D) (2.37 g; 12.0 mmol), water (30 mL), and concentrated hydrochloric acid (4.6 mL) was cooled with an ice bath, and a solution of sodium nitrite (870 mg; 12.6 mmol) in water (small amount) was added thereto. Thereafter, the resultant mixture was stirred for 2.5 hours with cooling with ice. Amidosulfuric acid (233 mg; 2.4 mmol) was added thereto to obtain a diazo-compound solution. Into another vessel were introduced the compound C (2.36 g; 12.0 mmol), sodium carbonate (954 mg; 9.0 mmol), and 1-N aqueous sodium hydroxide solution (10 mL). The pH of this mixture was adjusted to 11, and the mixture was cooled with ice. The diazo-compound solution was added dropwise to the mixture while maintaining a pH of 11-12 (with simultaneous dropwise addition of 2 wt % aqueous sodium hydroxide solution). After the temperature was raised to room temperature, the precipitate was taken out by filtration and washed with water. This precipitate was purified by silica gel column chromatography (chloroform:hexane=5:1), and the solid obtained was washed with a mixed solvent composed of methanol and water. Thus, the compound (1-1) (2.16 g; yield, 44%) was obtained.

The compound (1-1) obtained was dissolved in n-decane by the following procedure and evaluated for the color of the n-decane solution, absorption maximum wavelength of the n-decane solution, gram extinction coefficient of the n-decane solution at the absorption maximum wavelength, solubility in n-decane (% by weight), and product of the molar extinction coefficient of the n-decane solution at the absorption maximum wavelength and the molar concentration of the saturated n-decane solution. The results thereof are shown in Table 1.

(Evaluation of Dye)

The dye was added to n-decane, and this mixture was subjected to an ultrasonic treatment at 30° C. and ordinary pressure. When the dye completely dissolved, an additional amount of the dye was added so that the dye partly remained undissolved. The mixture thus treated was allowed to stand at room temperature (25° C.) for 12 hours and then subjected to centrifugal filtration with a 0.1-μm filter to obtain a saturated solution of the dye. This solution was diluted to an appropriate concentration and examined for absorption spectrum.

From values of absorption maximum wavelength in the wavelength range of 350-800 nm, gram extinction coefficient, and molar extinction coefficient which had been determined beforehand at an appropriate concentration and from the dilution ratio and the absorption spectrum of the diluted solution, the solubility (% by weight) and the product of the molar extinction coefficient at the absorption maximum wavelength and the molar concentration of the saturated solution were calculated.

Example 2

[Chem. 7]

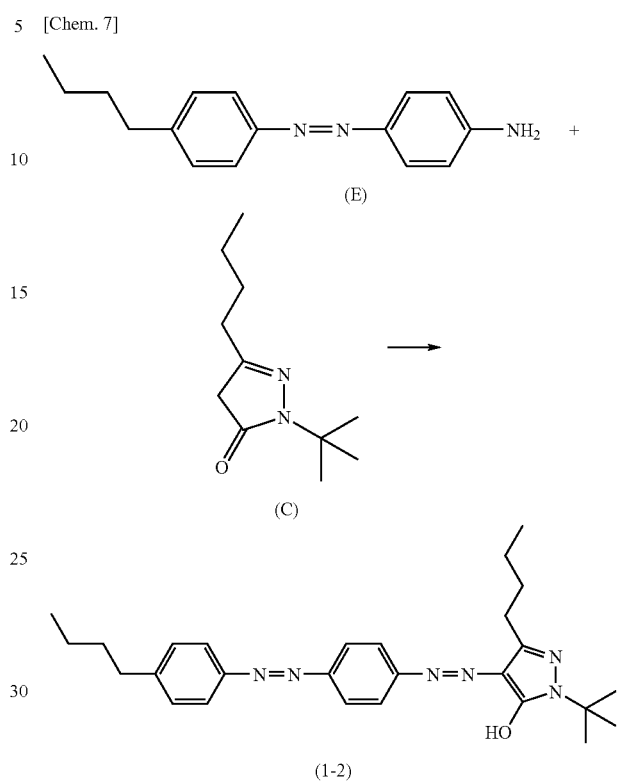

The compound (E) was synthesized by the method described in a document (*Liquid Crystals*, 1996, 21, 669).

A mixture of the compound (E) (2.53 g; 10.0 mmol), N-methyl-2-pyrrolidone (40 mL), and concentrated hydrochloric acid (3.0 mL) was cooled with an ice bath, and a solution of sodium nitrite (725 mg; 10.5 mmol) in water (small amount) was added thereto. This mixture was stirred for 2.5 hours with cooling with ice. Amidosulfuric acid (233 mg; 2.0 mmol) was added thereto to obtain a diazo-compound solution. Into another vessel were introduced the compound (C) (1.96 g; 10.0 mmol), sodium carbonate (795 mg; 7.5 mmol), and 1-N aqueous sodium hydroxide solution (10 mL). The pH of this mixture was adjusted to 11, and the mixture was cooled with ice. The disazo-compound solution was added dropwise to the mixture while maintaining an internal temperature of 4-8° C. and a pH of 11-12 (with simultaneous dropwise addition of 2 wt % aqueous sodium hydroxide solution). After the temperature was raised to room temperature, the reaction mixture was extracted with a mixed solvent composed of hexane and ethyl acetate, and the extracted product was purified by silica gel column chromatography (toluene:hexane=1:1). The solid obtained was washed with a mixed solvent composed of methanol and water to obtain the compound (1-2) (2.36 g; yield, 51%).

The compound (1-2) obtained was dissolved in n-decane by the following procedure and evaluated for the color of the n-decane solution, absorption maximum wavelength of the n-decane solution, gram extinction coefficient of the n-decane solution at the absorption maximum wavelength, solubility in n-decane (% by weight), and product of the molar extinction coefficient of the n-decane solution at the absorption maximum wavelength and the molar concentration of the saturated n-decane solution. The results thereof are shown in Table 1.

Example 3

The compound (1-3) was synthesized in the same manner as in Synthesis Example 1, except that use was made of the starting compound (C) in which the n-butyl had been replaced by ethyl.

[Chem. 8]

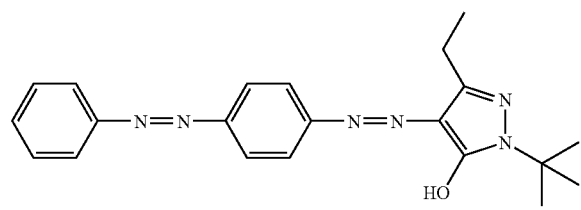
(1-3)

The compound (1-3) obtained was dissolved in n-decane by the following procedure and evaluated for the color of the n-decane solution, absorption maximum wavelength of the n-decane solution, gram extinction coefficient of the n-decane solution at the absorption maximum wavelength, solubility in n-decane (% by weight), and product of the molar extinction coefficient of the n-decane solution at the absorption maximum wavelength and the molar concentration of the saturated n-decane solution. The results thereof are shown in Table 1.

Comparative Example 1

The exemplified compound No. 1 (having the following structure) shown in JP-A-8-108634 was dissolved in n-decane by the procedure described in Example 1, and evaluated for the color of the n-decane solution, absorption maximum wavelength of the n-decane solution, gram extinction coefficient of the n-decane solution at the absorption maximum wavelength, solubility in n-decane (% by weight), and product of the molar extinction coefficient of the n-decane solution at the absorption maximum wavelength and the molar concentration of the saturated n-decane solution. The results thereof are shown in Table 1.

[Chem. 9]

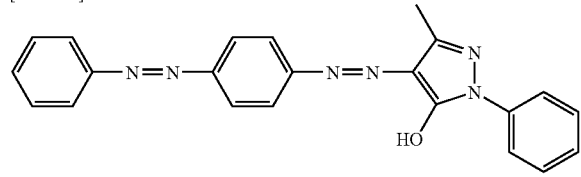

Comparative Compound 1
(Compound 1 of JP-A-8-108634)

It is apparent from Table 1 that the compounds 1-1, 1-2, and 1-3 of the Examples show a higher solubility than the comparative compound.

While the invention has been described in detail and with reference to specific embodiments thereof, it will be apparent to one skilled in the art that various changes and modifications can be made therein without departing from the spirit and scope thereof.

This application is based on a Japanese patent application filed on Nov. 12, 2007 (Application No. 2007-293226), the entire contents thereof being herein incorporated by reference.

INDUSTRIAL APPLICABILITY

The pyrazole disazo dye of the invention has excellent solubility in nonpolar solvents, in particular, hydrocarbon solvents, and has a high extinction coefficient. The dye is hence useful as a yellow dye for thermal transfer recording or for displays, etc.

The invention claimed is:

1. A pyrazole disazo dye having a solubility in n-decane of 1% by weight or higher at 25° C. and ordinary pressure, which is represented by the following formula (I):

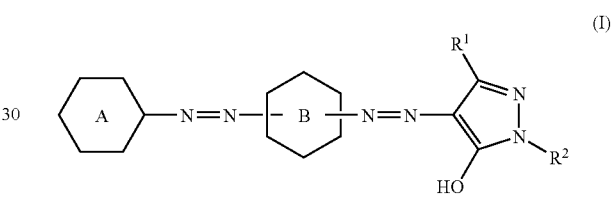
(I)

in which $R^1$ represents a $C_2$-$C_{10}$ alkyl group; $R^2$ represents a $C_3$-$C_{10}$ alkyl group; the six-membered ring A represents a phenyl group which may have a substituent; and the six-membered ring B represents a phenylene group which may have a substituent.

2. The pyrazole disazo dye according to claim 1, wherein $R^2$ is a branched alkyl.

3. The pyrazole disazo dye according to claim 1, wherein the six-membered ring A is a phenyl group which may be substituted with at least one group selected from the group consisting of $C_1$-$C_{10}$ alkyl groups and $C_1$-$C_{10}$ alkoxy groups, and the six-membered ring B is a phenylene group which may be substituted with at least one group selected from the group consisting of $C_1$-$C_{10}$ alkyl groups and $C_1$-$C_{10}$ alkoxy groups.

4. The pyrazole disazo dye according to claim 1, wherein the six-membered ring B is a 1,4-phenylene group.

5. A pyrazole disazo dye wherein the product of a molar extinction coefficient ($Lmol^{-1}cm^{-1}$) of an n-decane solution

TABLE 1

| | Compound | Color of solution | Absorption maximum wavelength (nm) | Gram extinction coefficient ($cm^2g^{-1}$, decane) | Solubility (wt %) (decane) | [Molar extinction coefficient at absorption maximum wavelength] × [molar concentration of saturated solution] |
|---|---|---|---|---|---|---|
| Example 1 | 1-1 | yellow | 417 | 62000 | 4.2 | 1900 $cm^{-1}$ |
| Example 2 | 1-2 | yellow | 421 | 61000 | 30 | 13000 $cm^{-1}$ |
| Example 3 | 1-3 | yellow | 415 | 69000 | 3.1 | 1400 $cm^{-1}$ |
| Comparative Example 1 | comparative compound 1 | almost no color | 416 | 97000 | 0.014 | 10 $cm^{-1}$ | thereof at an absorption maximum wavelength in the range of 350-800 nm and a concentration (molL$^{-1}$) of a saturated solution thereof in the solvent at 25° C. and ordinary pressure, is 2,000 (cm$^{-1}$) or larger, which is represented by the following formula (I):

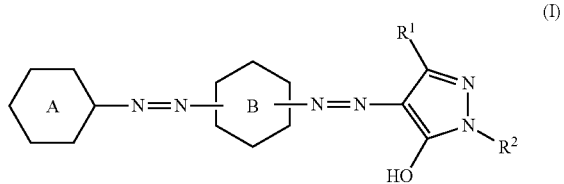 (I)

in which $R^1$ represents a $C_2$-$C_{10}$ alkyl group; $R^2$ represents a $C_3$-$C_{10}$ alkyl group; the six-membered ring A represents a phenyl group which may have a substituent; and the six-membered ring B represents a phenylene group which may have a substituent.

6. An ink comprising the pyrazole disazo dye according to claim 1.

7. An ink comprising the pyrazole disazo dye according to claim 5.

8. The pyrazole disazo dye according to claim 1, wherein $R^1$ represents a $C_2$-$C_6$ alkyl group.

9. The pyrazole disazo dye according to claim 8, wherein $R^1$ represents propyl, butyl, pentyl or hexyl.

10. The pyrazole disazo dye according to claim 1, wherein $R^2$ represents a $C_3$-$C_6$ alkyl group.

11. The pyrazole disazo dye according to claim 2, wherein $R^2$ represents a tert-butyl group.

12. The pyrazole disazo dye according to claim 1, wherein ring A is unsubstituted.

13. The pyrazole disazo dye according to claim 1, wherein ring A is substituted with a $C_3$-$C_8$ linear alkyl group.

14. The pyrazole disazo dye according to claim 1, wherein the solubility is 3% by weight or higher at 25° C.

15. The pyrazole disazo dye according to claim 1, wherein the solubility is 5% by weight or higher at 25° C.

16. The pyrazole disazo dye according to claim 1, wherein a solution thereof in a nonpolar solvent has an absorption maximum wavelength of about 350-500 nm in a wavelength range of 350-800 nm.

17. The pyrazole disazo dye according to claim 16, wherein the solution has no other absorption maximum in the wavelength range of 350-800 nm.

* * * * *